United States Patent [19]

Scheffler

[11] Patent Number: 5,013,617
[45] Date of Patent: May 7, 1991

[54] AIR EJECTOR SYSTEM FOR FUEL CELL PASSIVATION

[75] Inventor: Glenn W. Scheffler, Tolland, Conn.

[73] Assignee: International Fuel Cells Corporation, South Windsor, Conn.

[21] Appl. No.: 459,056

[22] Filed: Dec. 29, 1989

[51] Int. Cl.$^5$ .............................................. H01M 8/04
[52] U.S. Cl. ........................................ 429/17; 429/23
[58] Field of Search ...................... 429/17, 22, 23, 12, 429/13

[56] References Cited

U.S. PATENT DOCUMENTS

| | | | |
|---|---|---|---|
| 3,666,562 | 5/1972 | Sprengel | 429/23 X |
| 4,657,826 | 4/1987 | Tajima | 429/17 X |
| 4,657,828 | 4/1987 | Tajima | 429/17 X |
| 4,859,545 | 8/1989 | Scheffler et al. | 429/17 |
| 4,904,547 | 2/1990 | Mizumoto et al. | 429/22 |
| 4,963,443 | 10/1990 | Kamoshita | 429/17 |

*Primary Examiner*—Anthony Skapars

[57] ABSTRACT

A fuel cell (10) system in which a nitrogen ($N_2$) gas is used on the anode section (11) and a nitrogen/oxygen ($N_2/O_2$) gaseous mix is used on the cathode section (12) to maintain the cathode at an acceptable voltage potential during adverse conditions occurring particularly during off-power conditions, for example, during power plant shutdown, start-up and hot holds. During power plant shutdown, the cathode section is purged with a gaseous mixture of, for example, one-half percent (0.5%) oxygen ($O_2$) and ninety-nine and a half percent (99.5%) nitrogen ($N_2$) supplied from an ejector (21) bleeding in air (24/28) into a high pressure stream (27) of nitrogen ($N_2$) as the primary of majority gas. Thereafter the fuel gas in the fuel processor (31) and the anode section (11) is purged with nitrogen gas to prevent nickel (Ni) carbonyl from forming from the shift catalyst. A switched dummy electrical load (30) is used to bring the cathode potential down rapidly during the start of the purges. The 0.5%/99.5% $O_2N_2$ mixture maintains the cathode potential between 0.3 and 0.7 volts, and this is sufficient to maintain the cathode potential at 0.3 volts for the case of $H_2$ diffusing to the cathode through a 2 mil thick electrolyte filled matrix and below 0.8 volts for no diffusion at open circuit conditions. The ejector meters high pressure nitrogen gas with a choked orifice or venturi and uses the energy in the gas from the orifice or venture to suck ambient air into the nitrogen stream before entering the cathode section.

13 Claims, 2 Drawing Sheets

AIR EJECTOR SYSTEM FOR FUEL CELL PASSIVATION

REFERENCE TO RELATED APPLICATION

This application relates to some of the same subject matter as assignee's Ser. No. 07/458,852 filed concurrently herewith entitled "Reactant Gas Composition For Fuel Cell Potential Control" of Calvin L. Bushnell & Christopher L. Davis, the disclosure of which is incorporated herein by reference.

TECHNICAL FIELD

This invention relates to fuel cells and more particularly to the use of dilute oxygen in the cathode flow stream to control the cathode potential during nonoperating modes of the fuel cell stacks as a form of fuel cell passivation. The present invention relates even more particularly to an air ejector means for adding oxygen ($O_2$) to, for example, nitrogen ($N_2$) gas to produce the reactant gas to produce cell passivation without using complicated controls or support equipment as is commonly used on electric utility power plants.

BACKGROUND ART

In, for example, phosphoric acid fuel cells the electrodes can be damaged if the electrical potentials exceed certain limits. For example, the cathode of the fuel cell will undergo catalyst dissolution, catalyst support dissolution and catalyst layer flooding, if the potential exceeds, for example, eight-tenths (0.8) of a volt. In the other extreme, if it approaches the anode potential and is subsequently re-oxidized, re-crystallization of the catalyst takes place, and activity is lost. If the anode is allowed to approach the cathode potential [approximately, e.g., eight-tenths (0.8) of a volt], it will flood with electrolyte.

Electrical potential control for the fuel cell is most necessary during off-power conditions or non-operating modes, for example, during power plant shutdown, start-up and hot holds.

The present invention is directed generally to enhancing fuel cell electrical potential control, particularly during adverse conditions, and more particularly to the means used to add one component of the reactant gas to the other(s).

DISCLOSURE OF INVENTION

The present invention incorporates the use of an effective reactant gas composition, particularly in the exemplary embodiment, the use of a nitrogen/oxygen gas ($N_2/O_2$) mix on the cathode section, with only a relatively small percentage of oxygen preferably being used, and nitrogen gas ($N_2$) on the anode during these adverse conditions using an air ejector system for creating the mix without using complicated controls or support equipment as is commonly used on electric utility power plants. These adverse conditions include, as noted above, off-power conditions or non-operating modes, for example, during power plant shutdown, start-up and hot holds.

The present invention teaches the use preferably of a small, fixed area ejector in such a fuel cell passivation system to:

meter high pressure nitrogen gas with a choked orifice or venturi; and use the energy in the gas from the orifice or venturi to suck ambient air for the source of the dilute oxygen into the nitrogen stream before entering the cathode section.

A filter and an orifice or a metering valve can be added to the air inlet of the ejector to ensure a controlled addition of clean air for the dilute oxygen source. A commercially available ejector or eductor may be used in the invention, saving development and equipment costs.

The following exemplary sequence of events could be followed during, for example, a plant shut-down. The cathode section is purged with an appropriate gas mix of, for example, nitrogen and oxygen gases. This gas mix is supplied from the ejector bleeding in air using nitrogen gas as the primary gas, then purging the fuel gas with the nitrogen gas to prevent, for example, nickel (Ni) carbonyl from forming from the shift catalyst. This purge would not be necessary, if it were not for this possibility, or if the formation of nickel (Ni) carbonyl were otherwise prevented or avoided.

A dummy electrical load can be used to bring the cathode potential down rapidly during the start of the purges. Once it is down, the dummy electrical load typically would no longer be required.

Thus, a primary object of the present invention is to provide in association with a fuel cell an air ejector system for producing a reactant gas composition to control the cell potential, preventing damage to the electrodes of the fuel cell which would otherwise occur if the fuel cell potentials exceeded certain limits, particularly during off-power conditions or non-operating modes.

It is a further object to achieve the foregoing without the need of using complicated controls or support equipment, as commonly used on electric utility power plants.

It is still a further object to achieve the foregoing in a cost effective, proven manner preferably using commercially available ejector equipment.

The foregoing and other features and advantages of the present invention will become more apparent from the following further description and its related drawing.

BEST MODE FOR CARRYING OUT THE INVENTION

Figure 1:
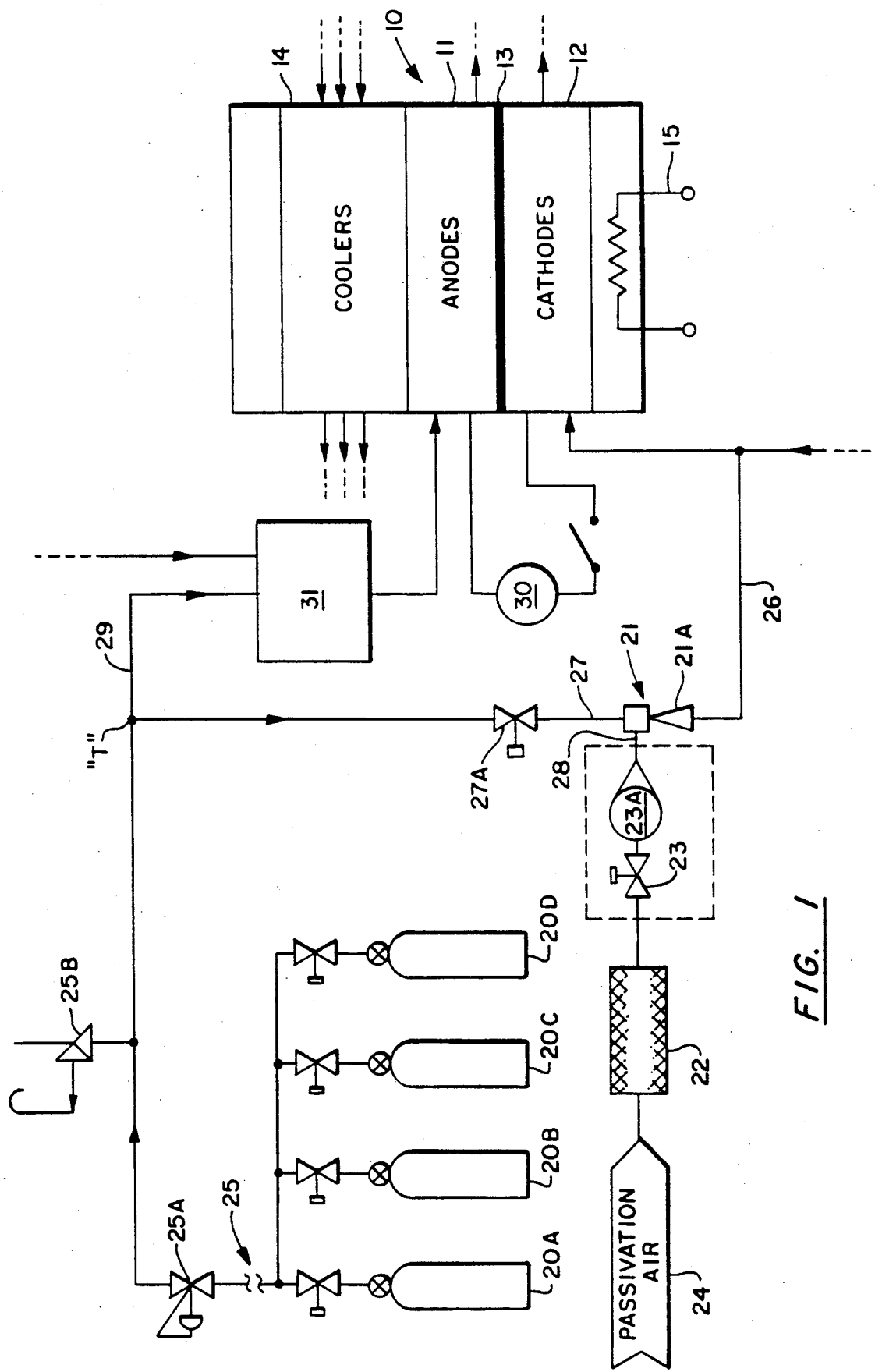
FIG. 1 is a simplified flow line diagram outlining the methodology and structure of an exemplary embodiment of the present invention used in association with an exemplary fuel cell, showing the preferred air ejector system used in the present invention to provide the desired reactant gas to the fuel cell cathode section to achieve the desired fuel cell passivation.

It is noted that FIG. 1 shows in simplified form an exemplary fuel cell 10 with which the present invention can be used, which cell can represent, for example, a two hundred (200 kw) kilowatt power plant unit.

As is known (see, for example, U.S. Pat. No. 4,780,187 of Levy & Lipman issued July 7, 1987, the disclosures of which are incorporated herein by reference), a fuel cell 10 is an electrochemical cell, which consumes fuel and an oxidant on a continuous basis to generate electrical energy. The fuel is consumed at an anode section 11 and the oxidant at a cathode section 12.

The anode and cathode sections 11 & 12 are placed in electrochemical communication by an appropriate electrolyte 13.

A typical fuel cell power plant comprises one or more stacks of fuel cells, the cells within each stack being connected electrically in series to raise the voltage potential of the stack. A stack may be connected in parallel with other stacks to increase the current generating capability of the power plant. Depending upon the desired size of the power plant, a stack of fuel cells may comprise a half dozen cells or less, or as many as several hundred cells. Air and fuel are usually fed to the cells by one or more manifolds per stack.

As illustrated in FIG. 1, a cooler section 14 and an electrical heater 15 can be used in conjunction with the fuel cell 10.

One typical fuel cell employs a phosphoric acid electrolyte. The phosphoric acid fuel cell uses air to provide oxygen ($O_2$) as an oxidant to the cathode section 12 and uses a hydrogen rich stream to provide hydrogen ($H_2$) as a fuel to the anode section 11. After passing through the cell 10, the depleted air and fuel streams are vented from the system on a continuous basis.

As noted above, the electrodes of such a fuel cell can be damaged, if the electrical potentials exceed certain limits.

To avoid this, in the exemplary fuel cell of FIG. 1 a nitrogen ($N_2$) gas is used on the anode section 11 and a nitrogen/oxide ($N_2/O_2$), gaseous mix is used on the cathode section 12 to maintain the cathode at an acceptable voltage potential, namely below, for example, eight-tenths (0.8) volts, during adverse conditions occurring particularly during off-power conditions or non-operating modes. As noted above, such off-power conditions or non-operating modes occur, for example, during power plant shutdown, start-up and hot holds.

During power plant shutdown, the cathode section 12 is purged with a gaseous mixture of, for example, one half percent (0.5% $O_2$) oxygen and ninety-nine and a half percent (99.5% $N_2$) nitrogen by volume, supplied from an ejector 21 bleeding in air using nitrogen ($N_2$) as the primary gas. The fuel gas is purged with nitrogen ($N_2$) gas to prevent nickel (Ni) carbonyl from forming from the shift catalyst.

As can be seen in FIG. 1, the nitrogen gas component is received from a series of interconnected storage tanks 20A-D, there being a sufficient number of tanks 20 to supply the volume of gas needed. The outlet lines from the tanks 20 are fed through an interface 25 through a regulator 25A to the injector line 27 and anode purge line 29. A pressure relief 25B is included in the nitrogen source line.

Thus, as can be seen in FIG. 1, a "T" line juncture "T" is provided between the relatively high pressure nitrogen gas source 20 and the fuel cell 10. One branch 27 of the "T" juncture leads to the ejector 21 and eventually to the cathode section 12, and the other branch 29 leads to the fuel processor 31 and thence to the anode section 11 providing them with a purging gas source. Suitable control means, such as, for example, valves, are provided to control the supply of the nitrogen gas source 20 initially to the line 27 (note valve 27A) and thereafter to the anode purge line 29 (the latter comparable to 27A not being illustrated).

In the ejector branch the nitrogen gas is mixed with ambient air in the ejector 21, after the ambient air 24 is filtered in filter 22, and the amount of air being injected is appropriated controlled by trim valve 23. The filter 22 and the orifice or metering valve 23A are added to the air inlet 28 of the ejector 21 to ensure a controlled addition of clean air to the nitrogen gas.

Figure 2:
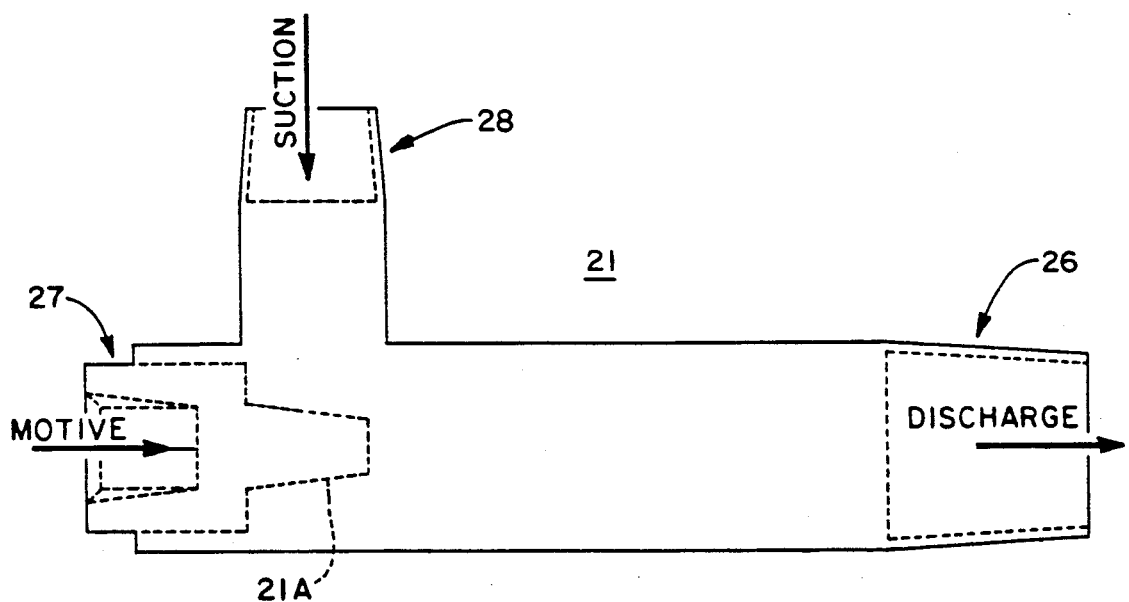
FIG. 2 is a side, generalized view of the preferred air ejector unit used in the system of FIG. 1.

The ejector 21 can be a commercially available, "off-the-shelf" ejector, such as, for example, the "Fox Mini-Eductor" (P/N 611210-060) by Fox Valve Development Corp. of East Hanover, N.J., illustrated in FIG. 2. Such an ejector has a line size discharge 26 of a quarter ($\frac{1}{4}$") inch, with motive (27) and suction (28) inlet sizes of an eighth ($\frac{1}{8}$") inch each. As is known, the flow of the motive fluid (e.g. high pressure nitrogen gas) through the venturi section 21A causes the suction fluid (e.g. air) to be sucked into the ejector 21 and mixed with the motive fluid for common discharge into discharge line 26.

The ejector 21 thus preferably is a small, fixed area ejector, which preferably meters high pressure nitrogen gas with a choked orifice or venturi and uses the energy in the gas from the orifice or venturi to suck ambient air 24 for the oxygen source into the nitrogen stream 27 before the mixed discharge 26 enters the cathode section 12.

Exemplary high pressures for the nitrogen, which serves as the primary or majority component of the gas mix, as well as for the purging gas source for the anode section 11, are in the range of about fifty to one hundred and fifty ($\approx$50-150) psig or more, although legal code restrictions may require a lower range, down to a maximum of, for example, one hundred and forty (140) psig. The relatively high pressure nitrogen gas is preferably at least above one hundred ($>$100) psig in pressure as it enters the ejector 21, in comparison to the ambient air 24.

The nitrogen/oxygen mixture then goes to the cathode section 12 of the cell stack 10 through mixed outlet line 26.

An exemplary, more restrictive percentage range for the oxygen component of the gaseous mix is from about two hundredths of a percent to about a half percent ($\approx$0.02-0.50%) by volume, although a broader, workable range is within about one hundredths of a percent to about one percent ($\approx$0.01-1.00%) by volume.

Sufficient oxygen should be used to establish the correct cathode potential, but too much oxygen can cause corrosion of the catalyst support. The appropriate amount of the oxygen component is subject to a number of factors, including the voltage potential and temperature involved in the fuel cell system.

It is noted that, although electrochemistry theory would indicate that a certain percentage of oxygen should be sufficient (e.g., 0.04%), experimentation under "real world" conditions have shown that a substantial amount more of oxygen (e.g. 0.50%) should be used than the standard calculations would indicate. It is surmised that some of the oxygen initially injected reacts with residual hydrogen ($H_2$) gas at the anode 11 to form water and is lost in the process.

The following exemplary sequence of events are followed during, for example, a plant shut-down. The cathode section 12 is purged with the appropriate gas mix of nitrogen and oxygen gases. This gas mix is supplied from the ejector 21 bleeding in air using nitrogen gas as the primary gas and air as the dilute oxygen source.

The fuel gas is then purged with the nitrogen gas through the anode purge line 29 to prevent, for example, nickel (Ni) carbonyl from forming from the shift catalyst. This anode purge includes purging the fuel processor 31 as well as the anode section 11. The fuel processor 31, generally illustrated in FIG. 1, typically includes a pre-oxidizer, hydrodesulfurizer (HDS), a reformer, heat exchanger(s) and a low temperature shift converter with a fuel line leading to the anodes (power section).

Thereafter the cathode section 12 may again be purged using the mixed nitrogen/oxygen gas line 26 with the ejector 21 serving as the simple, automatic mixing source. Additional purging may be necessary to maintain the proper gas mixtures over an extended period of time.

A switched dummy electrical load 30 preferably is used to bring the cathode potential down rapidly during the start of the purges. The preferred one-half to ninety-nine and a half percent (0.50%/99.50%) $O_2/N_2$ mixture maintains the cathode potential between, for example, the acceptable limits of three-tenths and seven-tenths (0.3-0.7) volts, and this concentration of oxygen gas ($O_2$) is sufficient to maintain the cathode potential at three-tenths (0.3) of a volt for the case of hydrogen ($H_2$), diffusing to the cathode through an exemplary two (2) mil thick electrolyte filled matrix 13 and below eight-tenths (0.8) of a volt for no diffusion at open circuit conditions.

Although this invention has been shown and described with respect to a detailed, exemplary embodiment thereof, it should be understood by those skilled in the art that various changes in form, detail, methodology and/or approach may be made without departing from the spirit and scope of this invention.

Having thus described an exemplary embodiment of the invention, that which is new and desired to be secured by Letters Patent is claimed below.

I claim:

1. A fuel cell system in which the cell potential is controlled within a certain maximum allowed voltage limit, comprising:
   an anode section;
   a cathode section having a maximum allowed voltage limit;
   an electrolyte providing electrochemical communication between said anode and said cathode sections; and
   a source of a gas mix to said cathode section purging said cathode section with a gaseous mixture during at least some off-power conditions causing said cathode potential to be limited to a voltage potential less than the maximum voltage limit of said cathode section, said mix including a dilute component and a majority component, said source including a small, fixed area ejector injecting the dilute component of one component of the gas mix with the majority component of the gas mix.

2. The fuel cell system of claim 1, wherein:
   said source of gas is a source of an oxygen ($O_2$) and nitrogen ($N_2$) gas mix, in which only a relatively small amount of oxygen is included in the mix comprising said dilute component; and
   wherein:
   said ejector includes a choked orifice or venturi metering high pressure nitrogen gas comprising said majority component, the gas from the orifice or venture sucking air as the source of oxygen into the nitrogen stream before entering said cathode section, the air being the source of the dilute oxygen component of said mix.

3. The fuel cell system of claim 2, wherein there is further included:
   a source of ambient air providing the dilute oxygen component; and
   a filter included in-line between said source of ambient air and said ejector, said filter providing clean air to said ejector.

4. The fuel cell system of claim 1, wherein:
   said source of gas is an ejector bleeding in air as a source of dilute oxygen as the dilute component into a stream of a relatively high pressure gas as the majority component.

5. The fuel cell system of claim 4, Wherein:
   said relatively high pressure gas is at a pressure in excess of one hundred psig and said air is at about ambient pressure as they enter said ejector to be mixed to form said source of gas.

6. The fuel cell system of claim 5, wherein there is further included in line between said source of ambient air and the ejector:
   a filter providing clean air to said ejector.

7. The fuel cell system of claim 6, wherein there is further included in line between said source of ambient air and the ejector:
   a trim valve and flow meter leading to said ejector.

8. The fuel cell system of claim 5, wherein:
   said source of gas is a source of an oxygen ($O_2$) and nitrogen ($N_2$) gas mix, in which only a relatively small amount of oxygen is included in the mix comprising said dilute component; and
   wherein:
   said ejector includes a choked orifice or venturi metering high pressure nitrogen gas comprising said majority component, the gas from the orifice or venture sucking air as the source of oxygen into the nitrogen stream before entering said cathode section, the air being the source of the dilute oxygen component of said mix.

9. The fuel cell system of claim 1, wherein there is further included:
   a "T" line juncture between the source of said majority component and the fuel cell, one branch of the "T" juncture leading to said ejector providing it with said majority component and eventually to said cathode section, and the other branch of said "T" juncture leading to said anode section providing it with a source of purging gas.

10. A method of controlling the cell potential in a fuel cell system, which fuel cell system includes
    an anode section,
    a cathode section having a maximum allowed voltage potential, and
    an electrolyte providing electrochemical communication between said anode and said cathode sections,
    comprising the following step(s):
    (a) purging said cathode section with a gas mix having a dilute gas component and a majority gas component during at least some off-power conditions, causing the cathode potential to be limited to a voltage potential less than said maximum voltage limit; and
    (b) ejecting said dilute gas component into a stream of said majority gas component upstream of the fuel cell using a small, limited area ejector to form said gas mix.

11. The method of claim 10, wherein there is included the step of:

using an oxygen (O$_2$) and nitrogen (N$_2$) gas mix, with oxygen being the dilute component and nitrogen being the majority component.

12. The method of claim 11, wherein there is included the step of:

using as the source of said gas mix an ejector bleeding in air as the oxygen source into a stream of high pressure nitrogen as the primary, majority gas component.

13. The method of claim 12, wherein there is included the step of:

using the ejector to meter high pressure nitrogen gas with a choked orifice or venturi and using the energy in the gas from the orifice or venture to suck ambient air into the nitrogen stream before entering the cathode section.

* * * * *